United States Patent
Nakashima

(10) Patent No.: US 12,199,316 B2
(45) Date of Patent: Jan. 14, 2025

(54) BATTERY MODULE AND METHOD FOR PRODUCING THE BATTERY MODULE

(71) Applicant: Prime Planet Energy & Solutions, Inc., Tokyo (JP)

(72) Inventor: Satoshi Nakashima, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 101 days.

(21) Appl. No.: 17/561,596

(22) Filed: Dec. 23, 2021

(65) Prior Publication Data

US 2022/0209377 A1 Jun. 30, 2022

(30) Foreign Application Priority Data

Dec. 25, 2020 (JP) ................. 2020-215972

(51) Int. Cl.
*H01M 50/562* (2021.01)
*H01M 50/51* (2021.01)

(52) U.S. Cl.
CPC ......... *H01M 50/562* (2021.01); *H01M 50/51* (2021.01)

(58) Field of Classification Search
CPC .............. H01M 50/207; H01M 50/224; H01M 50/227; H01M 50/231; H01M 50/562; H01M 50/552; H01M 50/502; H01M 50/503; H01M 50/51; H01M 2220/20; H01M 50/514; H01M 50/516; H01M 50/521; H01M 50/211; H01M 10/04; H01M 50/204; H01M 50/249; H01M 50/524;
(Continued)

(56) References Cited

U.S. PATENT DOCUMENTS 8,304,103 B2 * 11/2012 Watanabe ......... H01M 10/0585
429/152
2003/0146734 A1 8/2003 Kozu et al.
(Continued)

FOREIGN PATENT DOCUMENTS

CN 1416599 A 5/2003
CN 102820448 A 12/2012
(Continued)

OTHER PUBLICATIONS

English traslation JP-2004063133-A as taught by Kawamura (Year: 2004).*
English translation of JP Publication 2010-010145, Jan. 2010.*

*Primary Examiner* — Brittany L Raymond
(74) *Attorney, Agent, or Firm* — HAUPTMAN HAM, LLP

(57) ABSTRACT

Provided is a high-performance, high-quality battery module including plurality of electrode bodies connected in series. The battery module disclosed herein has a plurality of electrode bodies that include positive electrodes and negative electrodes, connecting terminals that connect the plurality of electrode bodies in series, and a film exterior body that covers the plurality of electrode bodies and the connecting terminals. The electrode bodies each includes a pair of flat surfaces and are made into a module by being superimposed on each other, such that the flat surfaces face each other. The connecting terminal is made up of a cladding material resulting from joining of a first metal, which is a metal of identical type to that of the positive electrode, and a second metal, which is a metal of identical type to that of the negative electrode.

13 Claims, 3 Drawing Sheets

(58) Field of Classification Search
CPC ............. H01M 50/548; H01M 50/553; H01M 50/571; Y02E 60/10
See application file for complete search history.

(56) References Cited

U.S. PATENT DOCUMENTS

| | | | |
|---|---|---|---|
| 2011/0293994 A1* | 12/2011 | Casoli | H01M 50/54 |
| | | | 429/158 |
| 2012/0315531 A1 | 12/2012 | Lev et al. | |
| 2014/0120405 A1 | 5/2014 | Lee et al. | |
| 2016/0197385 A1* | 7/2016 | Matsumoto | H01M 10/6554 |
| | | | 429/120 |
| 2016/0248052 A1* | 8/2016 | Minamitani | H01M 50/529 |
| 2017/0025723 A1 | 1/2017 | Isozaki et al. | |
| 2018/0175357 A1* | 6/2018 | Lin et al. | |

FOREIGN PATENT DOCUMENTS

| | | | |
|---|---|---|---|
| CN | 103703589 A | | 4/2014 |
| CN | 105914037 A | | 8/2016 |
| JP | 2004063133 A | * | 2/2004 |
| JP | 200679909 A | | 3/2006 |
| JP | 2006-221938 | * | 8/2006 |
| JP | 2006221938 A | | 8/2006 |
| JP | 2010-010145 | * | 1/2010 |
| JP | 2014517495 A | | 7/2014 |
| JP | 2016-004731 | * | 1/2016 |
| JP | 20164731 A | | 1/2016 |
| JP | 201646113 A | | 4/2016 |
| JP | 6227756 B2 | | 11/2017 |
| JP | 2019200884 A | | 11/2019 |
| JP | 2020-140874 A | | 9/2020 |
| WO | 2015140952 A1 | | 9/2015 |
| WO | 2015145715 A1 | | 10/2015 |

* cited by examiner

BATTERY MODULE AND METHOD FOR PRODUCING THE BATTERY MODULE

CROSS REFERENCE TO RELATED APPLICATIONS

The present application claims priority to Japanese Patent Application No. 2020-215972 filed on Dec. 25, 2020, the entire contents whereof are incorporated in the present specification by reference.

BACKGROUND

The present disclosure relates to a battery module and a method for producing the battery module.

Conventional battery modules are known in which multiple electrode bodies are combined and connected in series, to thereby achieve higher voltage. Relevant prior art documents include Japanese Patent Application Publication No. 2019-200884 and Japanese Patent Application Publication No. 2016-046113. For instance, Japanese Patent Application Publication No. 2019-200884 discloses a battery module that includes a plurality of electrode bodies that include positive electrode collector portions and negative electrode collector portions, wherein the positive electrode collector portion of a first electrode body and the negative electrode collector portion of a second electrode body extend from exterior bodies, and are connected in series outside the exterior bodies.

SUMMARY

The positive electrode collector and the negative electrode collector of the electrode bodies may be made of different types of metal. In one example, the positive electrode collector is made of aluminum and the negative electrode collector is made of copper. In such a case, due to joining of dissimilar metals the resistance of a connecting portion increases. Therefore, the resistance of the connecting portion should be reduced, from the viewpoint of improving performance. Moreover, joints of dissimilar metals are susceptible to corrosion (for instance electrolytic corrosion). In Japanese Patent Application Publication No. 2019-200884, the connecting portion is exposed and is thus susceptible to the action of outside air. As a result, corrosion may spread from the connecting portion, which may result in impaired quality.

It is a main object of the present disclosure, which has been arrived at in view of the considerations above, to provide a high-performance, high-quality battery module including a plurality of electrode bodies connected in series, and to provide a method for producing the battery module.

The present disclosure provides a battery module including: a plurality of electrode bodies that include positive electrodes and negative electrodes; connecting terminals that connect in series the positive electrodes and the negative electrodes of the plurality of electrode bodies; and a film exterior body that covers the plurality of electrode bodies and the connecting terminal. The plurality of electrode bodies each includes a pair of flat surfaces and are made into a module through superposition of a first electrode body of the plurality of electrode bodies and a second electrode body of the plurality of electrode bodies which is connected to the first electrode body by the connecting terminal, such that the flat surfaces face each other. The connecting terminal is made up of a cladding material resulting from joining of a first metal, which is a metal of identical type to that of the positive electrode, and a second metal, which is a metal of identical type to that of the negative electrode.

In the cladding material, the first metal and the second metal are joined to each other and are interatomically bonded. By connecting a plurality of electrode bodies in series using such a connecting terminal made up of a cladding material, it becomes possible to curtail resistance in the connecting portion even when a positive electrode collector portion and a negative electrode collector portion are made up of different metals. As a result, a high-performance battery module of reduced resistance can be provided. By covering the connecting terminal with a film exterior body, it becomes possible to prevent the connecting terminal from being exposed to outside air. As a result, the connecting portion is less likely to be corroded (for instance on account of electrolytic corrosion), and thus a high-quality battery module can be provided. Moreover, by arranging the plurality of electrode bodies such that the flat surfaces thereof face each other, it becomes possible to elicit the effect of facilitating restraint of the electrode bodies when these are made into a module. Battery performance can be brought out stably by restraining the battery module. For example, the distance between the electrodes of the electrode body can be kept constant during charging/discharge, and resistance unevenness and cycle deterioration at the time of charging/discharge can be likewise suppressed.

In a preferred implementation of the battery module disclosed herein, the interior of the film exterior body is partitioned into a plurality of independent electrode body accommodation spaces in which electrode bodies are accommodated respectively, together with an electrolyte solution, in a liquid-tight fashion. In consequence it becomes possible to prevent movement of the electrolyte solution, and to stably bring out superior battery performance. The performance and quality of the battery module are rendered yet higher as a result. Further, the battery module can be produced efficiently, and productivity can be increased.

In a preferred implementation of the battery module disclosed herein, a sealant film is integrated on a surface, opposing the film exterior body, of the cladding material, and the electrode body accommodation spaces adjacent to each other are partitioned by welding of the sealant film and the film exterior body. As a result the electrode body accommodation spaces can be stably sealed even when the positive electrode collector portion and the negative electrode collector portion are made up of different metals.

In a preferred implementation of the battery module disclosed herein, the sealant film is provided on the surfaces of the first metal and the second metal of the cladding material, avoiding a boundary between the first metal and the second metal. As a result the boundary (interface) between the first metal and the second metal, which corrode readily, can be suitably prevented from being exposed to the electrolyte solution. The quality and durability of the battery module are rendered accordingly yet higher.

In a preferred implementation of the battery module disclosed herein, the second metal is copper or a copper alloy, and a nickel plating layer is provided on the surface of the copper or the copper alloy. Leaching of copper can be suppressed as a result. Also, bondability with the sealant film is improved, and thus the sealant film does not readily peel off the cladding material. The sealability of the electrode body accommodation spaces is therefore improved.

In a preferred implementation of the battery module disclosed herein, the film exterior body is a deep-drawn shaped article including a plurality of bulging portions that are continuously formed therein by deep drawing and conform to the external shape of the electrode bodies. As a result, the battery module can be produced efficiently, and productivity can be increased.

In a preferred implementation of the battery module disclosed herein, the film exterior body comprises a multi-layer structure including a polyolefin resin layer and a polyester resin layer. The sealability and durability of the electrode body accommodation spaces is improved as a result.

In a preferred implementation of the battery module disclosed herein, the film exterior body is a laminate film including two resin layers, and a metal layer disposed between the two resin layers. The sealability and durability of the electrode body accommodation spaces is improved as a result.

The present disclosure provides also a method for producing a battery module, the method including: a connection step of connecting in series a plurality of electrode bodies that include positive electrodes and negative electrodes, using connecting terminals, each of which is made up of a cladding material resulting from joining of a first metal being a metal of identical type to that of the positive electrode, and a second metal being a metal of identical type to that of the negative electrode; an accommodation step of accommodating the plurality of electrode bodies connected in series and the connecting terminals, in the interior of a film exterior body; and a bending step of bending the connecting terminals such that flat surfaces of the plurality of electrode bodies face each other.

A low-resistance battery module can be produced efficiently by connecting in series beforehand the plurality of electrode bodies using the cladding material, prior to accommodation in the film exterior body. Productivity can be improved and costs reduced as a result.

DETAILED DESCRIPTION

Figure 1:
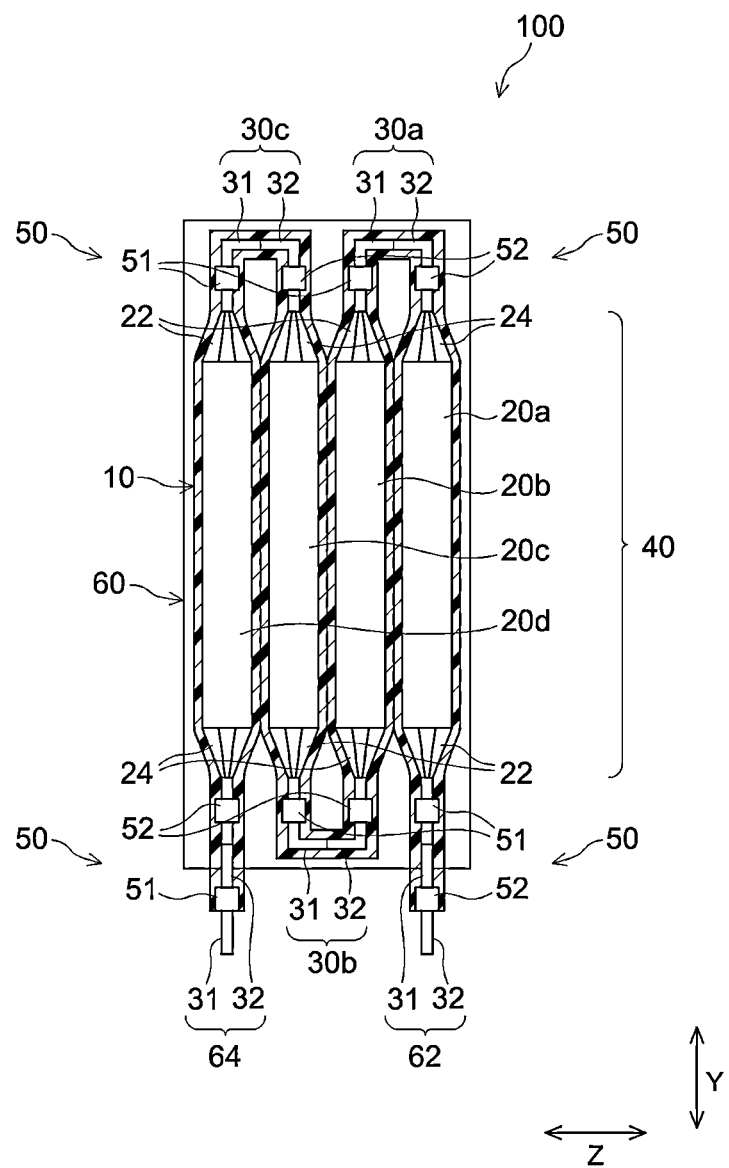
FIG. 1 is a longitudinal cross-sectional diagram illustrating schematically a battery module according to an embodiment.

Preferred embodiments of the art disclosed herein will be explained next with reference to accompanying drawings. Any features other than the matter specifically set forth in the present specification and that may be necessary for carrying out the present specification (for instance the general configuration and construction process of battery modules) can be regarded as instances of design matter, for a person skilled in the art, based on known techniques in the relevant technical field. The art disclosed herein can be realized on the basis of the disclosure of the present specification and common technical knowledge in the technical field in question. In the drawings that accompany the explanation below, members and portions that elicit identical effects are explained while denoted by identical reference numerals, and a recurrent explanation thereof will be omitted or simplified.

In the present specification the term "battery" denotes a power storage device in general capable of extracting electric energy, and encompasses conceptually primary batteries and secondary batteries. In the present specification the term "secondary battery" denotes a power storage device in general capable of being charged and discharged repeatedly, and encompasses conceptually so-called storage batteries (chemical batteries) such as lithium ion secondary batteries and nickel-metal hydride batteries, as well as capacitors (physical batteries) such as electrical double layer capacitors.

Battery Module 100

FIG. 1 is a longitudinal cross-sectional view illustrating schematically a battery module 100. The battery module 100 has a film exterior body 10, an electrode body group 40, a positive electrode external terminal 62, and a negative electrode external terminal 64. The electrode body group 40 has a plurality of (first to fourth) electrode bodies 20a, 20b, 20c, 20d, a plurality of (first to third) connecting terminals 30a, 30b, 30c, and an electrolyte solution (not shown). The battery module 100 is herein a lithium ion secondary battery. The film exterior body 10 and the electrode body group 40 are further accommodated in a module case 60 as a housing. The battery module 100 may further include a restraining member that restrains the electrode body group 40 from outside the module case 60.

In the explanation below, the reference symbols X, Y, Z in the drawings respectively denote a short-side direction, a long-side direction perpendicular to the short-side direction, and a thickness direction, of the electrode bodies 20a, 20b, 20c, 20d. However, the foregoing directions are merely directions for convenience of explanation, and are not meant to limit in any way the arrangement of the electrode bodies 20a, 20b, 20c, 20d.

The film exterior body 10 is a container that accommodates the electrode body group 40, i.e. the electrode bodies 20a, 20b, 20c, 20d, the connecting terminals 30a, 30b, 30c and the electrolyte solution. Herein, the film exterior body 10 is a single bag-shaped film that extends in the long-side direction Y and that covers the entire electrode body group 40. The film exterior body 10 is a deep-drawn shaped article including continuously formed therein, by deep drawing, multiple bulging portions that conform to the external shape of the electrode bodies 20a, 20b, 20c, 20d. The interior of the film exterior body 10 is partitioned by sealing portions 50. The interior of the film exterior body 10 is partitioned, by the sealing portions 50, into a plurality of independent electrode body accommodation spaces. Herein there are demarcated four electrode body accommodation spaces. The electrode bodies 20a, 20b, 20c, 20d are sealed together with the electrolyte solution, in a liquid-tight fashion, in the four respective electrode body accommodation spaces.

The film exterior body 10 has insulating properties and resistance to the electrolyte solution that is used. At least the inner surface of the film exterior body 10 (i.e. the faces opposing the electrode bodies 20a, 20b, 20c, 20d and the connecting terminals 30a, 30b, 30c) is made up of a heat-weldable resin layer. The film exterior body 10 may comprise a single-layer structure made up of one resin layer, or may comprise a multi-layer structure of two or more resin layers. Each resin layer is made of for instance a thermoplastic resin such as a polyolefin resin, a polyester resin, a polystyrene resin or a polyvinyl chloride resin. Examples of polyolefin resins include polyethylene (PE), polypropylene (PP) and acid-modified polyolefin resins such as maleic anhydride-modified polypropylene and maleic anhydride polyester. Examples of polyester resins include polyethylene terephthalate (PET). The film exterior body 10 preferably has a multilayer structure resulting from laying of a plurality of resin layers. Further, adhesive layers for bonding two respective opposing resin layers to each other may be provided between the resin layers. The multilayer film preferably has a polyolefin resin layer (for example a PP layer) and a polyester resin layer (for example a PET layer).

The multilayer film may be a laminate film including two resin layers, and a metal layer disposed between the two resin layers. The laminate film is not particularly limited, and may be similar to films used in conventionally known laminate-type batteries. The laminate film may be for instance made up of a first resin layer, a metal layer and second resin layer, in this order from the interior. The first resin layer is a layer (sealant layer) for enabling heat welding. The first resin layer is for instance made up of a thermoplastic resin such as those described above. The first resin layer is preferably a PP layer. The metal layer is a layer for increasing air-tightness. The metal layer is for instance made of a metallic material such as aluminum, iron or stainless steel. The metal layer is preferably an aluminum layer. The second resin layer is a layer (protective layer) for increasing durability and impact resistance. The second resin layer may constitute a surface layer (outermost layer of the laminate film). The second resin layer is for instance made up of a thermoplastic resin such as those described above. The second resin layer is preferably a PET layer. An adhesive layer for bonding the two layers to each other may be provided between the resin layers and the metal layer. Another layer may be further provided on the second resin layer.

The electrode bodies 20a, 20b, 20c, 20d are accommodated together with the electrolyte solution in four independent electrode body accommodation spaces. The electrode bodies 20a, 20b, 20c, 20d are connected in series via the connecting terminals 30a, 30b, 30c. The number of electrode bodies is typically an even number. The number of electrode bodies is four herein. However, the number of electrode bodies may be two or more (multiple electrode bodies), and is not particularly limited. As illustrated in FIG. 1, the electrode bodies 20a, 20b, 20c, 20d have an oblong (typically rectangular) cross section. The electrode bodies 20a, 20b, 20c, 20d each includes a pair of flat surfaces (wide surfaces). The electrode bodies 20a, 20b, 20c, 20d are made into a module by being disposed along the thickness direction Z such that the flat surfaces thereof face each other. In FIG. 1, the electrode bodies 20b, 20d are disposed flipped upside down with respect to the electrode bodies 20a, 20c. The electrode bodies 20a, 20b, 20c, 20d are juxtaposed, substantially parallelly to each other, in the thickness direction Z. Preferably, the electrode bodies 20a, 20b, 20c, 20d are acted upon, from the thickness direction Z, by the restraining pressure of the restraining member.

The configuration of the electrode bodies 20a, 20b, 20c, 20d may be identical to that of conventionally known batteries, and is not particularly limited. The electrode body 20a will be described in detail below as an example, but the electrode bodies 20b, 20c, 20d can be configured in the same way. The electrode body 20a includes a sheet-shaped positive electrode (positive electrode sheet) and a sheet-shaped negative electrode (negative electrode sheet). Herein there are a plurality of positive electrode sheets and a plurality of negative electrode sheets. The electrode body 20a is for instance a multilayer electrode body in which oblong (typically rectangular) positive electrode sheets and oblong (typically rectangular) negative electrode sheets are laid up in a state of being insulated from each other in the thickness direction Z. However, the electrode body 20a may be for instance a wound electrode body resulting from superimposing a band-like positive electrode sheet and a band-like negative electrode sheet on each other, while insulated from each other, and winding then the resulting stack in the longitudinal direction.

Each positive electrode has for instance a positive electrode collector, and a positive electrode active material layer (not shown) containing a positive electrode active material and fixed on the positive electrode collector. The positive electrode active material is for instance a lithium-transition metal complex oxide such as lithium-nickel-cobalt-manganese complex oxide. The positive electrode collector is made up of a conductive metal. The positive electrode collector is made up of a metallic material such as aluminum, an aluminum alloy, nickel, titanium or stainless steel. The positive electrode collector has aluminum as a main constituent (typically aluminum is the component of largest mass, preferably taking up 50 mass % or more; likewise hereafter). The positive electrode collector is herein a metal foil, specifically an aluminum foil. The positive electrode collector has a portion (positive electrode collector exposed portion) at which the positive electrode active material layer is not formed, on one edge in the long-side direction Y.

The negative electrode has for instance a negative electrode collector, and a negative electrode active material layer (not shown) containing a negative electrode active material and fixed on the negative electrode collector. The negative electrode active material is for instance a carbon material such as graphite. The negative electrode collector is typically made up of a conductive metal different from that of the positive electrode collector. The negative electrode collector is made of a metallic material such as copper, a copper alloy, nickel, titanium or stainless steel. The negative electrode collector may be mainly made up of copper. The negative electrode collector herein is a metal foil, specifically a copper foil. The negative electrode collector has a portion (negative electrode collector exposed portion) at which the negative electrode active material layer is not formed, on one edge in the long-side direction Y.

The electrode bodies 20a, 20b, 20c, 20d each includes a positive electrode collector portion 22 and a negative electrode collector portion 24. The positive electrode collector portions 22 are configured through laying of the positive electrode collector exposed portions of a plurality of positive electrode sheets, on one edge in the long-side direction Y. One end (the side of a first metal 31) of the positive electrode external terminal 62 is connected to the positive electrode collector portion 22 of the electrode body 20a. One end (the side of the first metal 31) of the connecting terminals 30a, 30b, 30c is connected to a respective positive electrode collector portion 22 of the electrode bodies 20b, 20c, 20d. The negative electrode collector portions 24 are configured through laying of the negative electrode collector exposed portions of a plurality of negative electrode sheets, on the other edge in the long-side direction Y. The negative electrode collector portions 24 are disposed on the reverse side from that of the positive electrode collector portions 22, in the long-side direction Y. The other end (side of a second metal 32) of the connecting terminals 30a, 30b, 30c is connected to a respective negative electrode collector portion 24 of the electrode bodies 20a, 20b, 20c. The other end (side of the second metal 32) of the negative electrode external terminal 64 is connected to the negative electrode collector portion 24 of the electrode body 20d.

The electrolyte solution is accommodated together with the electrode bodies 20a, 20b, 20c, 20d in four independent electrode body accommodation spaces. The electrolyte solution may be identical to that of conventionally known batteries, and is not particularly limited. The electrolyte solution is for instance a nonaqueous electrolyte solution containing a nonaqueous solvent and a supporting salt. The nonaqueous solvent includes for instance a carbonate. The supporting salt is for instance a fluorine-containing lithium salt such as lithium hexafluorophosphate ($LiPF_6$). However, the electrolyte solution may be in a solid state (solid electrolyte), integrated with the electrode bodies 20a, 20b, 20c, 20d.

The connecting terminals 30a, 30b, 30c are conductive members that electrically connect the electrode bodies 20a, 20b, 20c, 20d. Specifically, the connecting terminals 30a, 30b, 30c are members that connect in series the positive electrode collector portions 22 and the negative electrode collector portions 24 of the electrode bodies 20a, 20b, 20c, 20d. The connecting terminals 30a, 30b, 30c are joined (for instance welded) to the positive electrode collector portions 22 and the negative electrode collector portions 24. The number of connecting terminals can be established for instance based on the number of electrode bodies. The number of connecting terminals is typically (number of electrode bodies −1), and is three herein. As illustrated in FIG. 1, the connecting terminals 30a, 30b, 30c are bent such that the flat surfaces of the electrode bodies 20a, 20b, 20c, 20d face each other. The connecting terminals 30a, 30b, 30c have a square C-shape in a cross-sectional view. However, the cross section of the connecting terminals 30a, 30b, 30c may be for instance V-shaped or U-shaped.

The connecting terminals 30a, 30b, 30c are made up of a conductive metal. The connecting terminal 30a will be explained in detail below as an example, but the connecting terminals 30b, 30c as well can be configured in the same way. The connecting terminal 30a has a plate shape. The connecting terminal 30a has flexibility allowing for bending. The plate thickness of the connecting terminal 30a is typically smaller than the plate thickness of the module case 60. The plate thickness of the connecting terminal 30a may be larger than that of the metal foil as the positive electrode collector and/or the negative electrode collector. The connecting terminal 30a is made of a cladding material resulting from joining of the first metal 31 and the second metal 32 that is different from the type of the first metal.

The end on the side of each first metal 31 is joined to a respective positive electrode collector portion 22. The end on the side of each second metal 32 is joined to a respective negative electrode collector portion 24. The first metal 31 is a metal of identical type to that of the positive electrode collector. The first metal 31 may be for instance aluminum or an aluminum alloy. The second metal 32 is a metal of identical type to that of the negative electrode collector. The second metal 32 may be for instance copper or a copper alloy. Preferably, a plating layer (for instance a nickel plating layer) coated with a metal such as nickel is formed on copper or on a copper alloy.

Sealant films 51, 52 are integrated on the surfaces of the connecting terminals 30a, 30b, 30c, on the sides facing the film exterior body 10. As a result, processing defects at the time of formation of the sealing portions 50 are less likely to occur, even when a cladding material is used as the connecting terminals 30a, 30b, 30c. The sealant films 51, 52 cover the connecting terminals 30a, 30b, 30c such that the positive electrode collector portions 22 do not come into direct contact with the film exterior body 10. The sealant films 51, 52 are typically welded to the connecting terminals 30a, 30b, 30c. However, the sealant films 51, 52 may be affixed using an adhesive or the like. The sealant films 51, 52 are joined (for instance welded) to the opposing film exterior body 10. The sealing portions 50 become formed as a result at both ends in the long-side direction Y.

The sealant film 51 is provided on the surface of the first metal 31 of the cladding material. The sealant film 52 is provided on the surface of the second metal 32. The sealant film 51 is interposed between the first metal 31 and the film exterior body 10. The sealant film 52 is interposed between the second metal 32 and the film exterior body 10. The sealant films 51, 52 are provided herein on the peripheral edge of a boundary 33 (see FIG. 2) of each first metal 31 and each second metal 32. In other words, the sealant films 51, 52 are formed avoiding the boundary 33 between the first metal 31 and the second metal 32. In other embodiments, however, the sealant films 51, 52 may be provided so as to cover the boundary 33 between the first metal 31 and the second metal 32.

The sealant films 51, 52 may include a single-layer structure made up of one resin layer, or a multilayer structure include two or more resin layers. The resin layer may be made of a resin material having resistance to the electrolyte solution that is used, and which melts at a temperature comparable to that of the resin layer of the film exterior body 10. It suffices that the sealant films 51, 52 deliver suitable adhesiveness to the resin layer of the film exterior body 10 and to the connecting terminal 30a. Examples of the resin material that makes up the sealant films 51, 52 include thermoplastic resins exemplified as the resin materials capable of forming the resin layer of the film exterior body 10. The sealant films 51, 52 may be polyolefin sheets.

The sealing portions 50 are provided at positions overlapping the connecting terminals 30a, 30b, 30c in a plan view. The sealing portions 50 partition the interior of the film exterior body 10, to demarcate a plurality of independent electrode body accommodation spaces. The sealing portions 50 seal both ends of the electrode body accommodation spaces in the long-side direction Y. The sealing portions 50 seal the electrode body accommodation spaces in a liquid-tight fashion. The sealing portions 50 are formed through joining of the sealant films 51, 52 provided in the connecting terminals 30a, 30b, 30c, to the film exterior body 10. Herein, the first metal 31 is bonded to the film exterior body 10 via the sealant film 51, and the second metal 32 is bonded to the film exterior body 10 via the sealant film 52. The sealing portions 50 are for instance weld portions at which the sealant films 51, 52 and the film exterior body 10 are welded (for instance heat-welded). Film exterior 10 portions directly faces each other at the boundaries 33 (see FIG. 2). The sealing portions 50 prevent the boundaries 33 from coming into contact with outside air or the electrolyte solution.

The positive electrode external terminal 62 is connected to one end of the electrode body group 40 (specifically, the positive electrode collector portion 22 of the electrode body 20a) inside the film exterior body 10. The negative electrode external terminal 64 is connected to the other end of the electrode body group 40 (specifically, the negative electrode collector portion 24 of the electrode body 20d) inside the film exterior body 10. The positive electrode external terminal 62 and the negative electrode external terminal 64 extend from the interior to the exterior of the film exterior body 10. One end of the positive electrode external terminal 62 and one end of the negative electrode external terminal 64 extend outside the module case 60.

The positive electrode external terminal 62 and the negative electrode external terminal 64 may be identical to those of conventionally known batteries, and are not particularly limited. The positive electrode external terminal 62 and/or the negative electrode external terminal 64 may be made of one type of metal, or may for instance be made of a cladding material such as those described above. In a case where the positive electrode external terminal 62 and/or the negative electrode external terminal 64 are made of a cladding material, preferably the boundaries 33 are covered with the film exterior body 10, thereby not being exposed to outside air or to the electrolyte solution. The positive electrode external terminal 62 and/or the negative electrode external terminal 64 may be the same members as the connecting terminals 30a, 30b, 30c. Preferably, for instance the side of the positive electrode external terminal 62 that is connected to the corresponding positive electrode collector portion 22 is made up of aluminum or an aluminum alloy, while the side extending to the exterior is made up of a different metal (for instance copper or a copper alloy). Preferably, for instance the side of the negative electrode external terminal 64 that is connected to the corresponding negative electrode collector portion 24 is made up of copper or a copper alloy, while the side extending to the exterior is made up of a different metal (for instance aluminum or an aluminum alloy).

Method for Producing the Battery Module 100

The battery module 100 is characterized in that adjacent electrode bodies 20a, 20b, 20c, 20d are connected in series by respective connecting terminals 30a, 30b, 30c. Other battery configurations may be identical to those of conventional batteries. Such a battery module 100 can be produced in accordance with a production method that includes for instance a connection step, an accommodation step and a bending step. However, other steps may be included at any stage.

Figure 2:
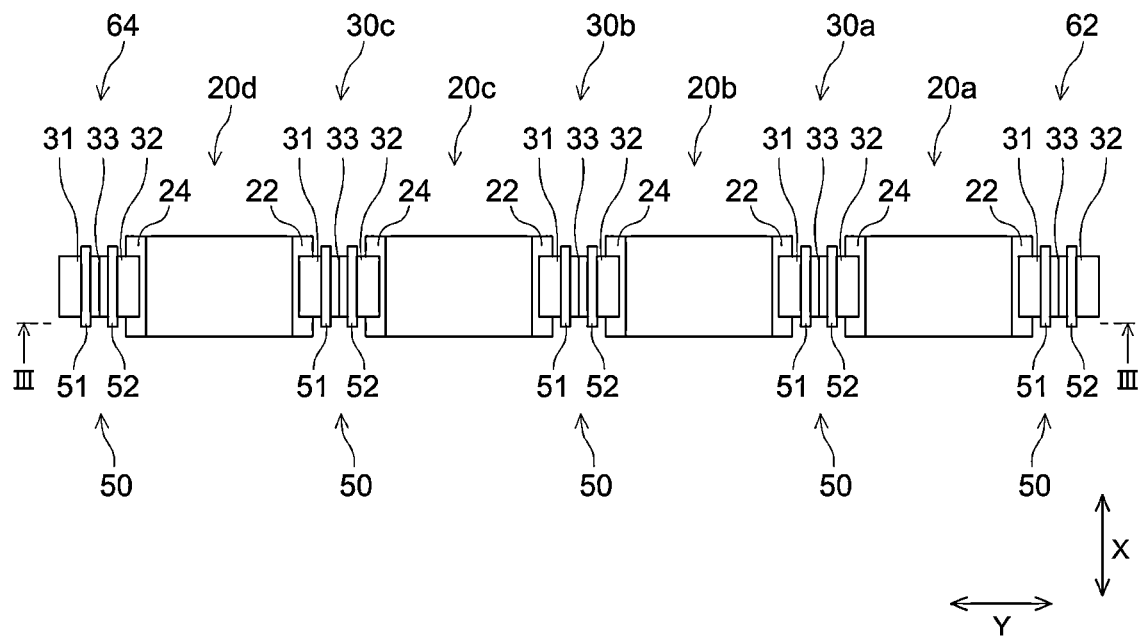
FIG. 2 is a plan-view diagram illustrating schematically a connection step.
Figure 3:
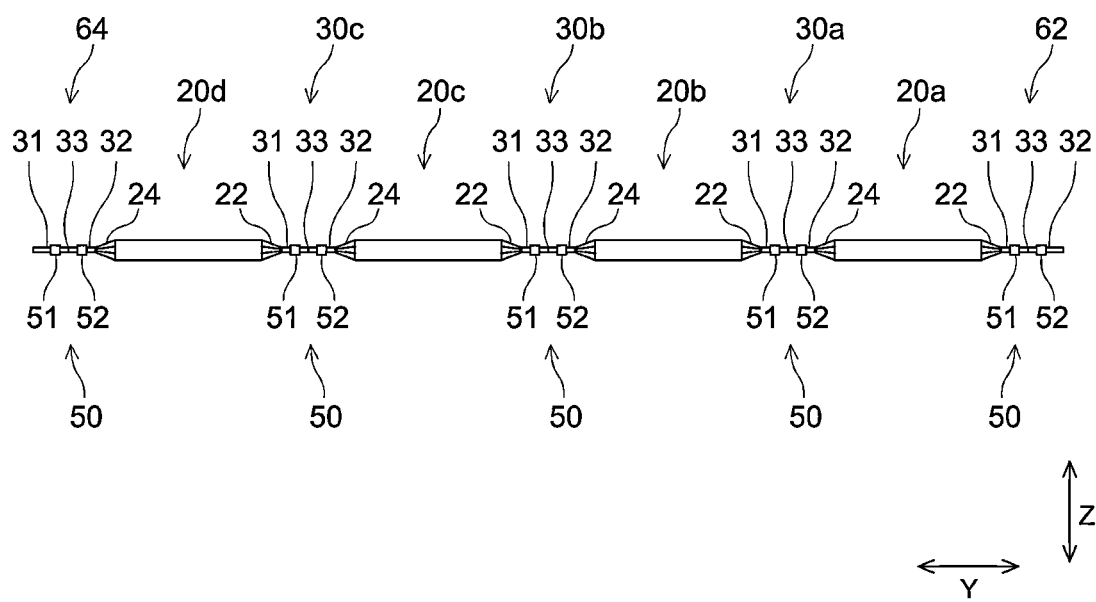
FIG. 3 is a cross-sectional diagram along line in FIG. 2.

Firstly, electrode bodies 20a, 20b, 20c, 20d, connecting terminals 30a, 30b, 30c, a positive electrode external terminal 62, and a negative electrode external terminal 64 such as those described above are prepared in the connection step. The positive electrode external terminal 62 and the negative electrode external terminal 64 are made of a cladding material in which the first metal 31 and the second metal 32 are joined, similarly to the connecting terminals 30a, 30b, 30c. FIG. 2 is plan-view diagram illustrating schematically the connection step. FIG. 3 is a cross-sectional diagram along line of FIG. 2. The electrode bodies 20a, 20b, 20c, 20d illustrated in FIG. 2 have a rectangular shape in a plan view.

Next, as illustrated in FIG. 2 and FIG. 3, the electrode bodies 20a, 20b, 20c, 20d are arranged side by side in a straight line. The electrode bodies 20a, 20b, 20c, 20d are arranged herein in a row in the long-side direction Y (series direction). In this case the positive electrode collector portions 22 of the electrode bodies 20b, 20c, 20d are set to oppose the negative electrode collector portions 24 of the electrode bodies 20a, 20b, 20c. Next, the connecting terminals 30a, 30b, 30c are arranged so as to span across the positive electrode collector portions 22 and the negative electrode collector portions 24 that face each other. At this time, the ends of the connecting terminals 30a, 30b, 30c on the side of the first metal 31 are placed on the positive electrode collector portions 22, and the ends on the side of the second metal 32 are placed on the negative electrode collector portions 24. The positive electrode external terminal 62 is disposed at the positive electrode collector portion 22 of the electrode body 20a and the negative electrode external terminal 64 is disposed at the negative electrode collector portion 24 of the electrode body 20d. The positive electrode collector portions 22 are then joined to the connecting terminals 30a, 30b, 30c and to the positive electrode external terminal 62. The negative electrode collector portions 24 are joined to the connecting terminals 30a, 30b, 30c, and to the negative electrode external terminal 64. The method for joining the foregoing is not particularly limited, and joining can be performed by welding, such as ultrasonic welding, resistance welding or laser welding.

The sealant films 51, 52 are integrated on the surfaces of each connecting terminal 30a, 30b, 30c. The sealant films 51, 52 are provided, for instance through welding (for instance heat welding) of a resin-made film, on the surfaces of the connecting terminals 30a, 30b, 30c. The sealant films 51, 52 illustrated in FIG. 2 have a rectangular shape in a plan view. The length of the sealant film 51 in the short-side direction X is larger than that of the positive electrode collector portions 22, and the length of the sealant film 52 is larger than that of the negative electrode collector portions 24. As illustrated in FIG. 3, the sealant films 51, 52 cover the positive electrode collector portions 22 and the negative electrode collector portions 24 over the entirety of the thickness direction Z.

A first combined product resulting from series connection of the electrode bodies 20a, 20b, 20c, 20d to each other via the connecting terminals 30a, 30b, 30c can thus be produced as described above.

Figure 4:
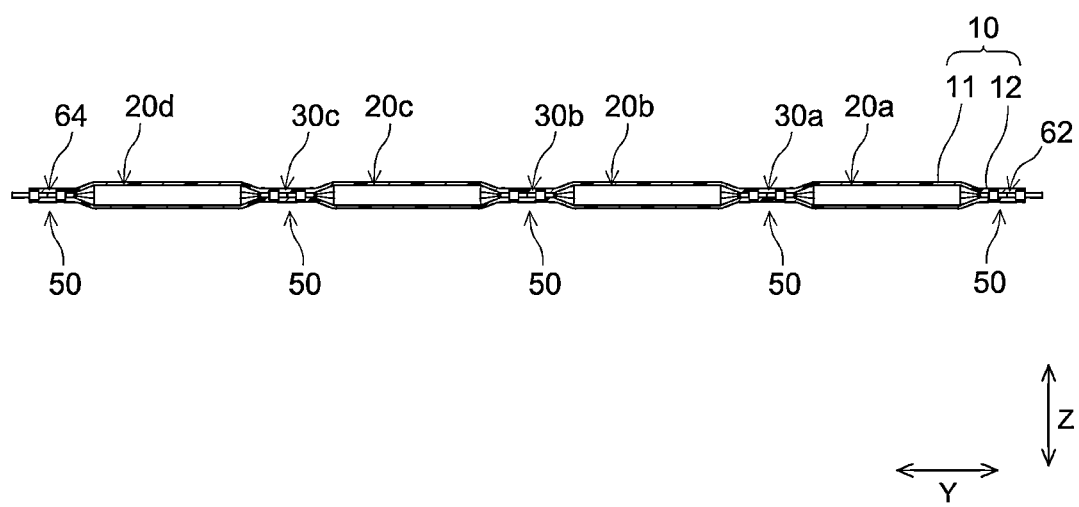
FIG. 4 is a diagram, corresponding to FIG. 3, illustrating schematically an accommodation step.

In the accommodation step there are firstly prepared a film exterior body 10 such as the above and an electrolyte solution. FIG. 4 is a diagram, corresponding to FIG. 3, schematically illustrating the accommodation step. The film exterior body 10 illustrated in FIG. 4 is made up of two rectangular resin films (sheets) 11, 12 that are elongated in the long-side direction Y. The resin films 11, 12 each have a shape that conforms to the external shape of the electrode bodies 20a, 20b, 20c, 20d, and include also a plurality of continuously shaped bulging portions. The resin films 11, 12 having such a shape can be produced for instance through deep drawing of a resin film.

As illustrated in FIG. 4, the first combined product produced in the connection step is next sandwiched between the two resin films 11, 12 in the thickness direction Z. The sealant films 51, 52 and the resin films 11, 12 are then welded to each other, to form the sealing portions 50. The sealing portions 50 can be formed for instance through heat welding in which the sealant films 51, 52 and the film exterior body 10 are sandwiched and heated in a welding device (for instance a heat sealer). As a result, both ends of the electrode bodies 20a, 20b, 20c, 20d in the long-side direction Y become sealed, whereby the electrode body accommodation spaces are partitioned.

In the accommodation step, the electrode bodies 20a, 20b, 20c, 20d are impregnated with the electrolyte solution, and thereafter the opposing resin films 11, 12 are welded along the edges at both ends in the short-side direction X. The electrode bodies 20a, 20b, 20c, 20d become sealed as a result in a liquid-tight fashion, together the electrolyte solution, in the electrode body accommodation spaces.

A second combined product in which the electrode bodies 20a, 20b, 20c, 20d and the connecting terminals 30a, 30b, 30c are accommodated in the film exterior body 10 can be thus produced as described above.

In the bending step, the portions of the first metal 31 and of the second metal 32 in the connecting terminals 30a, 30b, 30c are bent, to bring the flat surfaces of the electrode bodies 20a, 20b, 20c, 20d so as to face each other. It suffices that the connecting terminals 30a, 30b, 30c be bent while avoiding the boundaries 33. That is, it suffices that the connecting terminals 30a, 30b, 30c be bent between the portions at which the sealant films 51, 52 are provided and the boundaries 33. The electrode bodies 20*a*, 20*b*, 20*c*, 20*d* become juxtaposed substantially parallelly in the thickness direction Z.

The battery module 100 can be thus produced as described above.

The battery module 100 can be used in various applications. For instance the battery module 100 can be suitably used as a high-output power source (drive power source) for motors mounted in vehicles. The type of vehicle is not particularly limited, and examples thereof include plug-in hybrid electric vehicles (PHEV), hybrid electric vehicles (HEV) and battery electric vehicles (BEV).

Concrete examples of the present disclosure have been explained in detail above, but the examples are merely illustrative in nature, and are not meant to limit the scope of the claims in any way. The art set forth in the claims encompasses various alterations and modifications of the concrete examples illustrated above.

The invention claimed is:

1. A battery module, comprising:
   a plurality of electrode bodies that include positive electrodes and negative electrodes;
   a connecting terminal that connects in series the positive electrodes and the negative electrodes of the plurality of electrode bodies; and
   a film exterior body that covers the plurality of electrode bodies and the connecting terminal,
   wherein:
   the plurality of electrode bodies each includes a pair of flat surfaces and are made into a module through superposition of a first electrode body and a second electrode body which is connected to the first electrode body by the connecting terminal, such that the flat surfaces face each other;
   the connecting terminal is made up of a cladding material resulting from joining of a first metal, which is a metal of identical type to that of the positive electrode, and a second metal, which is a metal of identical type to that of the negative electrode;
   an interior of the film exterior body is partitioned into a plurality of independent electrode body accommodation spaces in which the plurality of electrode bodies are accommodated respectively, together with an electrolyte solution, in a liquid-tight fashion;
   a sealant film is integrated on a surface, opposing the film exterior body, of the cladding material;
   the plurality of electrode body accommodation spaces adjacent to each other are partitioned by welding of the sealant film and the film exterior body; and
   the sealant film is provided on the first metal and the second metal of the cladding material, avoiding a boundary between the first metal and the second metal.

2. The battery module according to claim 1, wherein:
   the second metal is copper or a copper alloy, and a nickel plating layer is provided on the surface of the copper or the copper alloy.

3. The battery module according to claim 1, wherein:
   the film exterior body is a deep-drawn shaped article including a plurality of bulging portions that are continuously formed therein by deep drawing and conform to an external shape of each of the plurality of electrode bodies.

4. The battery module according to claim 1, wherein:
   the film exterior body comprises a multilayer structure including a polyolefin resin layer and a polyester resin layer.

5. The battery module according to claim 1, wherein:
   the film exterior body is a laminate film including two resin layers, and a metal layer disposed between the two resin layers.

6. The battery module according to claim 1, wherein:
   the connecting terminal has a flexibility for bending.

7. The battery module according to claim 6, wherein:
   the connecting terminal has the flexibility for bending at an approximately 90 degrees.

8. The battery module according to claim 1, wherein:
   the connecting terminal is bent to face toward an adjacent connecting terminal.

9. The battery module according to claim 8, wherein:
   an end surface of the first metal is opposite to and directly joined to an end surface of the second metal at the boundary between the first metal and the second metal.

10. The battery module according to claim 9, wherein the sealant film is not provided on the end surface of the first metal and the end surface of the second metal.

11. The battery module according to claim 1, wherein:
    the film exterior body has a first portion covering one of the pair of flat surfaces of the first electrode body and a second portion covering one of the pair of flat surfaces of the second electrode body, the first portion facing the second portion.

12. The battery module according to claim 1, wherein the sealant film directly contacts the surface of the cladding material.

13. A method for producing a battery module, wherein the battery module includes:
    a plurality of electrode bodies that include positive electrodes and negative electrodes;
    connecting terminals that connect in series the positive electrodes and the negative electrodes of the plurality of electrode bodies; and
    a film exterior body that covers the plurality of electrode bodies and the connecting terminals, wherein:
    the plurality of electrode bodies each includes a pair of flat surfaces and are made into a module through superposition of a first electrode body and a second electrode body which is connected to the first electrode body by one of the connecting terminals, such that the flat surfaces face each other; and
    each of the connecting terminals is made up of a cladding material resulting from joining of a first metal, which is a metal of identical type to that of the positive electrode, and a second metal, which is a metal of identical type to that of the negative electrode, the method comprising:
    a connection step of connecting in series the plurality of electrode bodies that include the positive electrodes and the negative electrodes, by using the connecting terminals, each of which is made up of the cladding material resulting from joining of the first metal, which is the metal of identical type to that of the positive electrode, and the second metal, which is the metal of identical type to that of the negative electrode, and a sealant film is integrated on a surface of the cladding material;
    an accommodation step of accommodating the plurality of electrode bodies connected in series and the connecting terminals, in an interior of the film exterior body, the sealant film and the film exterior body are heat welded to each other, to form a sealing portion, each of the plurality of electrode bodies is impregnated with an electrolyte solution, and each of the plurality of electrode bodies and the electrolyte solution are sealed by welding the film exterior body; and a bending step of bending the connecting terminals such that the flat surfaces of the plurality of electrode bodies face each other, wherein the sealant film is provided on the first metal and the second metal of the cladding material, avoiding a boundary between the first metal and the second metal.

\* \* \* \* \*